(12) United States Patent
Ikeda et al.

(10) Patent No.: US 10,787,393 B2
(45) Date of Patent: Sep. 29, 2020

(54) SILICON NITRIDE SINTERED BODY AND HIGH-TEMPERATURE-RESISTANT MEMBER USING THE SAME

(71) Applicants: KABUSHIKI KAISHA TOSHIBA, Tokyo (JP); TOSHIBA MATERIALS CO., LTD., Yokohama-Shi, Kanagawa-Ken (JP)

(72) Inventors: Isao Ikeda, Kanagawa (JP); Kai Funaki, Kanagawa (JP); Yutaka Abe, Kanagawa (JP)

(73) Assignees: KABUSHIKI KAISHA TOSHIBA, Tokyo (JP); TOSHIBA MATERIALS CO., LTD., Yokohama-Shi (JP)

(*) Notice: Subject to any disclaimer, the term of this patent is extended or adjusted under 35 U.S.C. 154(b) by 328 days.

(21) Appl. No.: 15/564,320

(22) PCT Filed: Mar. 28, 2016

(86) PCT No.: PCT/JP2016/059948
§ 371 (c)(1),
(2) Date: Oct. 4, 2017

(87) PCT Pub. No.: WO2016/163263
PCT Pub. Date: Oct. 13, 2016

(65) Prior Publication Data
US 2018/0134626 A1    May 17, 2018

(30) Foreign Application Priority Data

Apr. 7, 2015  (JP) ................... 2015-078571
Jun. 22, 2015 (JP) ................... 2015-124901

(51) Int. Cl.
*C04B 35/58*  (2006.01)
*B23K 35/36*  (2006.01)
(Continued)

(52) U.S. Cl.
CPC ........ *C04B 35/584* (2013.01); *B23K 35/3601* (2013.01); *C04B 35/64* (2013.01);
(Continued)

(58) Field of Classification Search
CPC ... B23K 35/3601; C04B 35/584; C04B 35/64; C04B 35/387; F16C 19/00; F16C 33/32; F16C 2202/20
See application file for complete search history.

(56) References Cited

U.S. PATENT DOCUMENTS

2011/0039068 A1* 2/2011 Takao ................ C04B 35/5935
                                                          428/141
2012/0321851 A1  12/2012 Takao

FOREIGN PATENT DOCUMENTS

CN    102762520 A    10/2012
EP    1 223 150 A2    7/2002
(Continued)

OTHER PUBLICATIONS

International Preliminary Report on Patentability dated Aug. 2, 2017 in corresponding International Application No. PCT/JP2016/059948 (7 pages) and English translation (5 pages).
(Continued)

*Primary Examiner* — Brian W Jennison
(74) *Attorney, Agent, or Firm* — Foley & Lardner LLP

(57) ABSTRACT

The present invention provides a silicon nitride sintered body including silicon nitride crystal grains and a grain boundary phase, wherein the silicon nitride crystal grains are covered with the grain boundary phase and width of the grain boundary phase is 0.2 nm or more. It is preferable that the width of the grain boundary phase is 0.2 nm to 5 nm. Additionally, it is preferable that the silicon nitride sintered body includes 15% by mass or less of the grain boundary phase. According to the above-described configuration, it is
(Continued)

possible to provide a high-temperature-resistant silicon nitride sintered body in which degradation of the grain boundary phase under high temperature environment is suppressed. This silicon nitride sintered body is suitable for constituent material of a high-temperature-resistant member, use environment of which is 300° C. or higher.

8 Claims, 2 Drawing Sheets

(51) Int. Cl.
*C04B 35/584* (2006.01)
*F16C 33/32* (2006.01)
*C04B 35/64* (2006.01)
*F16C 19/00* (2006.01)

(52) U.S. Cl.
CPC .............. *F16C 19/00* (2013.01); *F16C 33/32* (2013.01); *F16C 2202/20* (2013.01)

(56) References Cited

FOREIGN PATENT DOCUMENTS

| EP | 2 537 819 A1 | 12/2012 |
| JP | H07-180738 A | 7/1995 |
| JP | 2010-194591 A | 9/2010 |
| JP | 5268750 B2 | 8/2013 |
| WO | WO-2011/102298 A1 | 8/2011 |
| WO | WO-2013/035302 A1 | 3/2013 |

OTHER PUBLICATIONS

Cinibulk, Michael K., et al.: "Quantitative Comparison of TEM Techniques for Determining Amorphous Intergranular Film Thickness", J. Am. Ceram. Soc, 1993, vol. 76, No. 2, pp. 426-432, ISSN:0002-7820.

Kleebe, Hans-Joachim, et al.: "Statistical Analysis of the Intergranular Film Thickness in Silicon Nitride Ceramics", J. Am. Ceram. Soc, 1993, vol. 76, No. 8, pp. 1969-1977, ISSN: 0002-7820.

* cited by examiner

SILICON NITRIDE SINTERED BODY AND HIGH-TEMPERATURE-RESISTANT MEMBER USING THE SAME

TECHNICAL FIELD

Embodiments described herein generally relate to a silicon nitride sintered body and a high-temperature-resistant member using the silicon nitride sintered body.

BACKGROUND ART

Silicon nitride sintered bodies are used for various applications such as a bearing ball, a rolling roll, a friction stir welding tool, a hot work tool, a substrate for a heater, a semiconductor substrate, and a cutting tool.

Japanese Patent No. 5268750 (Patent Document 1) discloses a silicon nitride sintered body in which a number of silicon nitride crystal grains having a major axis of 3 µm or more per unit area of 10 µm×10 µm is controlled. In the case of the silicon nitride sintered body disclosed in Patent Document 1, Vickers hardness and/or wear resistance are improved by the above control.

Additionally, Japanese Patent Laid-Open No. 2010-194591 (Patent Document 2) discloses a silicon nitride sintered body which constitutes a friction stir welding tool. In the friction stir welding tool disclosed in Patent Document 2, a cover layer is provided on the surface of this tool in order to improve its durability. Friction stir welding is a method of pressing a welding tool against a pair of members to be bonded while the welding tool is rotated at high speed and then bonding the pair of members to each other by using friction heat. Since friction heat is used, the temperature of the welding tool reaches a high temperature of 300° C. or higher. In the friction stir welding tool disclosed in Patent Document 2, the cover layer is provided for imparting durability under high temperature environment.

Silicon nitride sintered bodies are used for various applications as described above. For instance, along with increase in rotational speed of a bearing ball, temperature of the sliding surface of the bearing ball is increased to high temperature. Similarly, as to a friction stir welding tool, temperature of its sliding surface is heated up to high temperature due to the friction heat. As to a rolling roll, a hot work tool, and a cutting tool, their use environments are subjected to high temperature in some cases.

PRIOR ART DOCUMENTS

Patent Documents

Patent Document 1: Japanese Patent No. 5268750
Patent Document 2: Japanese Patent Laid-Open No. 2010-194591

SUMMARY OF THE INVENTION

Problems to be Solved by the Invention

Although conventional silicon nitride sintered bodies are excellent in wear resistance under an ordinary temperature environment, conventional silicon nitride sintered bodies are not necessarily satisfactory in terms of durability under high temperature. In view of the above-described problem, an object of the present invention is to provide a silicon nitride sintered body which shows excellent durability even under high temperature environment.

Means for Solving the Problems

In one embodiment, a silicon nitride sintered body includes silicon nitride crystal grains and a grain boundary phase, wherein the silicon nitride crystal grains are covered with the grain boundary phase and width of the grain boundary phase is 0.2 nm or more. By controlling the width of the grain boundary phase, durability under high temperature environment can be greatly improved.

Thus, durability under high temperature environment is greatly improved in the case of a high-temperature-resistant member which is configured by using a silicon nitride sintered body in the above embodiment.

DESCRIPTION OF EMBODIMENTS

Figure 1:
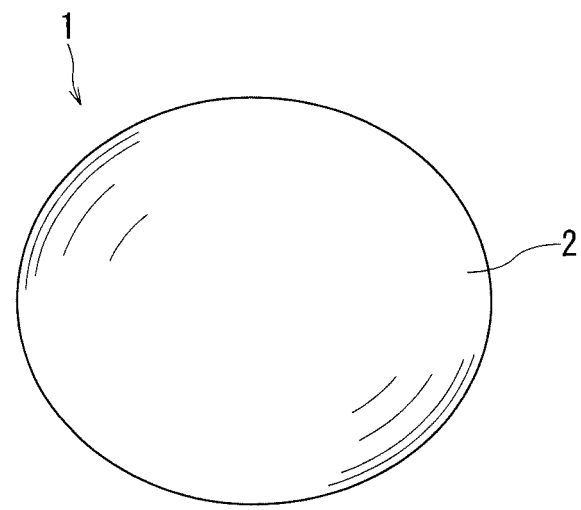
FIG. 1 is a perspective view illustrating a bearing ball which is configured by using a silicon nitride sintered body according to one embodiment.

A silicon nitride sintered body according to one embodiment includes silicon nitride crystal grains and a grain boundary phase, and characterized in that the silicon nitride crystal grains are covered with the grain boundary phase and width of the grain boundary phase is 0.2 nm or more. Additionally, it is preferable that width of the grain boundary phase is in the range of 0.2 to 5 nm.

The silicon nitride sintered body is produced by a method comprising the steps of: mixing silicon nitride powder and sintering aid powder thereby to form a molded body; and then sintering the molded body. By performing the sintering step, the sintering aid powder constitutes a grain boundary phase. The silicon nitride sintered body according to one embodiment is characterized in that width of the grain boundary phase is 0.2 nm or more. Width of the grain boundary phase is a thickness of the grain boundary phase which is formed at an interface between two of the silicon nitride crystal grains. When there is a grain boundary phase of a predetermined thickness at the interface between two of the silicon nitride crystal grains, it indicates that the surface of each of silicon nitride crystal grains is covered with the grain boundary phase. Additionally, the nearest distance among adjacent silicon nitride crystal grains is preferably 0.2 nm or more, and is more preferably in the range of 0.2 to 5 nm.

Note that silicon nitride crystal grains on the surface of the silicon nitride sintered body, as like, e.g., a surface of a sintered body after polishing, may not be covered with the grain boundary phase. In other words, the silicon nitride sintered body is characterized in that every silicon nitride crystal grain is covered with the grain boundary phase in any cross-section of the silicon nitride sintered body.

By covering the silicon nitride crystal grains with the grain boundary phase, durability of the silicon nitride sintered body under high temperature environment can be improved. When the silicon nitride crystal grains are not covered with the grain boundary phase, it indicates a state where the silicon nitride crystal grains are directly contact to each other, i.e., a state where the grain boundary phase is missing and formed as a pore. By adjusting the width of the grain boundary phase to 0.2 nm or more like this embodiment, the silicon nitride crystal grains can be firmly bonded to each other through the grain boundary phase. When the width of the grain boundary phase is less than 0.2 nm, a strong bonding structure cannot be obtained.

When the width of the grain boundary phase is too thick, the thick grain boundary phase functions as a starting point of breakage and thus there is a possibility that strength of the silicon nitride sintered body is lowered. Accordingly, width of the grain boundary phase is preferably in the range of 0.2 to 5 nm, and is more preferably in the range of 0.5 to 2 nm. Any two of the silicon nitride crystal grains are bonded to each other through the thin grain boundary phase as thin as 0.2 to 5 nm interposed therebetween, whereby the strength of the silicon nitride sintered body can be improved without causing the grain boundary phase to become the starting point of breakage. In particular, Vickers hardness at high temperature range can be enhanced.

The width of the grain boundary phase is measured by a method using a scanning transmission electron microscope (STEM). Specifically, an arbitrary cross-section of the silicon nitride sintered body is observed by a STEM (in which magnified photograph is taken). Next, by using the magnified photograph, an intensity profile of a grain boundary part is acquired for the region where two of the silicon nitride crystal grains are closest to each other. This makes it possible to measure the width of the grain boundary phase.

In the silicon nitride sintered body of the present embodiment, the width of the grain boundary phase between two of the silicon nitride crystal grains is 0.2 nm or more. In other words, the shortest (closest) distance between two of the silicon nitride crystal grains is 0.2 nm or more. When width of the grain boundary phase is 0.2 to 5 nm, this means that the shortest distance between two of the silicon nitride crystal grains is in the range of 0.2 to 5 nm.

In the silicon nitride sintered body of the present embodiment, Vickers hardness Hv at room temperature (25° C.) is preferably 1450 or more and Vickers hardness Hv at 300° C. is preferably 1350 or more. In addition, its Vickers hardness Hv at 1000° C. is preferably 850 or more. The silicon nitride sintered body of the present embodiment is controlled in terms of width of its grain boundary phase, and thus can maintain a high hardness even when being subjected to a high temperature condition of 300° C. or higher as a use environment.

Measurement of Vickers hardness is performed on the basis of JIS-R-1610, and performed under a test force of 9.807 N.

Additionally, it is preferable that the silicon nitride sintered body includes a grain boundary phase as an additive component in a content of 15% by mass or less. The additive component means a component other than silicon nitrides. In the silicon nitride sintered body, the additive component other than silicon nitrides means a sintering aid component. The sintering aid component constitutes a grain boundary phase. When an amount of the additive component exceeds 15% by mass to be excessively large in content, the grain boundary phase is excessively formed to be large in quantity. When the grain boundary phase is excessively large in quantity, it is difficult to control the width of the grain boundary phase within the range of 0.2 to 5 nm.

In addition, the silicon nitride sintered body of the present embodiment has a structure in which thin and long β-silicon nitride crystal grains are intricately intertwined (complicatedly entangled). When the amount of the sintering aid component is excessive, it is undesirable because the silicon nitride sintered body partially forms a structure in which silicon nitride crystal grains are not intricately intertwined.

The content of the additive component is preferably set to 3% or more by mass and 12.5% or less by mass. It is more preferable that the content of the additive component is set to 5% by mass or more and 12.5% by mass or less. When the content of the additive component is less than 3% by mass, the grain boundary phase is too small in quantity and thus there is a possibility that density of the silicon nitride sintered body is disadvantageously decreased. When the content of the additive component is specified to be 3% by mass or more, a relative density of the sintered body is easily adjusted to be 95% or more. When the content of the additive component is specified to be 5% by mass or more, a relative density of the sintered body can be easily adjusted to be 98% or more.

The additive component preferably includes three or more elements selected from Y, Al, Mg, Si, Ti, Hf, Mo, and C. The compound form of the additive component is not particularly limited to a specific one, as long as the additive component includes, as its constituent elements thereof, Y (yttrium), Al (aluminum), Mg (magnesium), Si (silicon), Ti (titanium), Hf (hafnium), Mo (molybdenum), and C (carbon). For instance, the compound form of the additive component may include oxides (inclusive of composite oxides), nitrides (inclusive of composite nitrides), oxynitrides (inclusive of composite oxynitrides), and carbides (inclusive of composite carbides).

As described later on, when the additive component is added as the sintering aid in the production process of the sintered body, oxides (inclusive of composite oxides), nitrides (inclusive of composite nitrides), and carbides (inclusive of composite carbides) are preferably used. In the case of the element Y, yttrium oxide ($Y_2O_3$) is preferable. In the case of the element Al, aluminum oxide ($Al_2O_3$), aluminum nitride (AlN), and $MgO.Al_2O_3$ spinel are preferable. In the case of the element Mg, magnesium oxide (MgO) and $MgO.Al_2O_3$ spinel are preferable. In the case of the element Si, silicon oxide ($SiO_2$) and silicon carbide (SiC) are preferable. In the case of the element Ti, titanium oxide ($TiO_2$) and titanium nitride (TiN) are preferable. In the case of the element Hf, hafnium oxide ($HfO_2$) is preferable. In the case of the element Mo, molybdenum oxide ($MoO_2$) and molybdenum carbide ($Mo_2C$) are preferable. With regard to the element C, it is preferable to add it as silicon carbide (SiC), titanium carbide (TiC), and/or titanium carbonitride (TiCN). By adding two or more of these additive components in combination, it is possible to constitute a grain boundary phase including three or more elements selected from Y, Al, Mg, Si, Ti, Hf, Mo, and C. The additive component preferably includes four or more elements selected form Y, Al, Mg, Si, Ti, Hf, Mo, and C.

By including three, four, or more elements selected from Y, Al, Mg, Si, Ti, Hf, Mo, and C in the sintering aid components, it is possible to improve sinterability, prevent coarsening of silicon nitride crystal grains, and form a high-strength crystal structure in which β-silicon nitride crystal grains are intricately intertwined.

According to the combinations of these sintering aids, solid solution and/or a crystalline compound can be formed in a grain boundary phase. By forming the solid solution and/or the crystalline compound, a durability of a sintered body at high temperature is improved. Additionally, presence/absence of a crystalline compound can be analyzed by an XRD (X-ray diffraction method). When a peak excluding the peak caused by a silicon nitride is observed in the XRD analysis, it indicates that a crystal compound is present. As conditions of the XRD analysis, Cu target (CuKα) is used, a tube voltage is set to 40 kV, a tube current is 40 mA, and a slit diameter is 0.2 mm. The XRD analysis is performed in the scanning range (2θ) of 20° to 60°. When a peak other than the peak caused by a silicon nitride appears in this range, it can be confirmed that a crystal compound exists in the grain boundary phase.

By defining the width of the grain boundary phase between two grains to be equal to or thicker than 0.2 nm, more preferably 0.2 to 5 nm as described above, a fine crystal compound can be interposed at the interface between the two grains. As a result, a durability of a sintered body at high temperature can be further improved.

As a combination of the sintering aids to be added in the production process, the following combinations are preferable.

As a first combination, MgO, $Al_2O_3$, SiC, and $SiO_2$ are added in contents of 0.1 to 1.7% by mass, 0.1 to 4.3% by mass, 0.1 to 10% by mass and 0.1 to 2% by mass, respectively. Due to this combination, four elements of Mg, Al, Si, and C are included as the additive components. When MgO and $Al_2O_3$ are added, MgO and $Al_2O_3$ may be added as $MgO.Al_2O_3$ spinel in a content of 0.2 to 6% by mass.

$TiO_2$ may be further added to the above first combination in a content of 0.1 to 2% by mass. The addition of $TiO_2$ to the first combination results in the inclusion of five elements of Mg, Al, Si, C, and Ti as the additive components.

As a second combination, $Y_2O_3$, $MgO.Al_2O_3$ spinel, AlN, $HfO_2$, and $Mo_2C$ are added in contents of 0.2 to 3% by mass, 0.5 to 5% by mass, 2 to 6% by mass, 0.5 to 3% by mass and 0.1 to 3% by mass, respectively. In the second combination, six elements of Y, Mg, Al, Hf, Mo, and C are added as the additive components.

As a third combination, $Y_2O_3$, AlN, and $HfO_2$ are added in contents of 2 to 7% by mass, 3 to 7% by mass, and 0.5 to 4% by mass, respectively. Herewith, three elements of Y, Al, and Hf are added as the additive components.

In the first to third combinations, the upper limit of the total content of the sintering aid components is set to 15% by mass or less.

Any of the first to third combinations does not include such a combination that both of $Y_2O_3$ and $Al_2O_3$ are added. The first combination does not use $Y_2O_3$. The second combination includes $MgO.Al_2O_3$ spinel as added therein. The third combination does not use $Al_2O_3$. Sintering of the combination of $Y_2O_3$ and $Al_2O_3$ tends to easily form yttrium-aluminum oxides such as YAG ($Al_5Y_3O_{12}$), YAM ($Al_2Y_4O_9$), and YAL ($AlYO_3$).

In addition, the above-described first to third combinations tend to form a crystalline compound, and can form crystal compounds other than YAG, YAM, and YAL. In other words, when a crystal compound other than YAG, YAM, and YAL is contained, durability at high temperature can be improved.

The above-described additive components are also excellent in the role of the sintering aid. Accordingly, the proportion of the β-type silicon nitride crystal grains each having an aspect ratio of 2 or more can be made as high as 60% or more. In order to determine the proportion of the β-type silicon nitride crystal grains having the aspect ratio of 2 or more, an arbitrary cross-section of the silicon nitride sintered body is observed with a SEM, and a magnified photograph (magnification: 3000 or more) of the cross-section is taken. The major axes (long diameter) and the minor axes (short diameter) of the silicon nitride crystal grains shown in the magnified photograph are measured, and the aspect ratios are determined. The area proportion (%) (area ratio %) of the silicon nitride crystal grains each having an aspect ratio of 2 or more per a unit area of 50 μm×50 μm is determined.

When the average of the major axis and the minor axis is defined as a grain diameter in a similar cross-section, a number ratio of silicon nitride grains having a grain diameter of 2 μm or more to the total silicon nitride grains can be as high as 35% or more. The upper limit of the number ratio is preferably 55% or less. When the number ratio of excessively large grains is too large, it becomes difficult to control the width of the grain boundary phase.

In the above-described silicon nitride sintered body, not only Vickers hardness but also a fracture toughness value and three-point bending strength can be improved so that the fracture toughness value can attained to 6.0 MPa·m$^{1/2}$ or more and the three-point bending strength can be 900 MPa or more. Note that the fracture toughness value is calculated on the basis of an indentation fracture method (IF method) in JIS-R-1607 by using Niihara's equation. Additionally, the three-point bending strength is a value obtained on the basis of JIS-R-1601.

The above-described silicon nitride sintered body is suitable as a material for constituting a high-temperature-resistant member. The silicon nitride sintered body of the present embodiment has a high Vickers hardness under a high temperature environment and thus the sintered body is suitable as a component of a high-temperature-resistant member which is subjected to a use environment of 300° C. or higher. Such application fields include any one of a bearing ball, a rolling roll, a friction stir welding tool, a hot work tool, and a heater.

FIG. 1 illustrates a bearing ball composed of a silicon nitride sintered body according to one embodiment of the present invention. In FIG. 1, the reference sign 1 denotes a bearing ball and the reference sign 2 denotes a friction surface. Since the bearing ball 1 is a sphere, the entire spherical surface functions as the friction surface 2. The member for constituting the bearing ball 1 is the silicon nitride sintered body. Since durability at high temperature is improved, it can be applied to bearings used under a high temperature environment. Additionally, even when the frictional heat caused by high-speed rotation reaches a high temperature, an excellent durability can be maintained.

Figure 2:
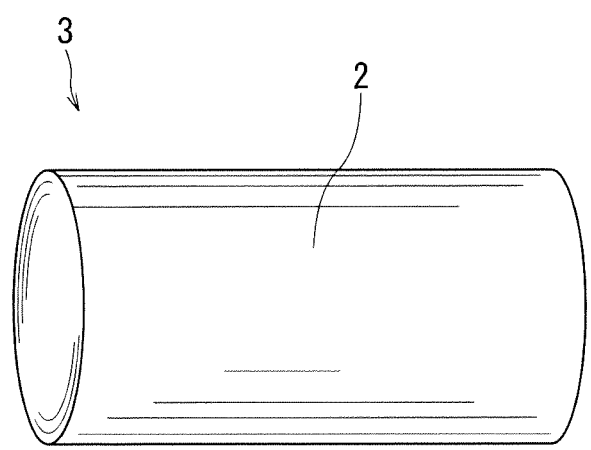
FIG. 2 is a perspective view illustrating a rolling roll which is configured by using a silicon nitride sintered body according to one embodiment.

FIG. 2 illustrates a rolling roll composed of the silicon nitride sintered body of the present embodiment. In FIG. 2, the reference sign 3 denotes a rolling roll and the reference sign 2 denotes the friction surface (rolling surface). The rolling roll 3 has a cylindrical shape. The cylindrical roll surface serves as the friction surface 2. Rolling rolls are applied to various usage environments such as room temperature processing and hot working. In the rolling roll 3 of the present embodiment, the friction surface 2 is composed of a silicon nitride sintered body. Since durability of the silicon nitride sintered body at high temperature is improved, the rolling roll 3 can be applied to a rolling roll for hot working at 300° C. or higher.

Figure 3:
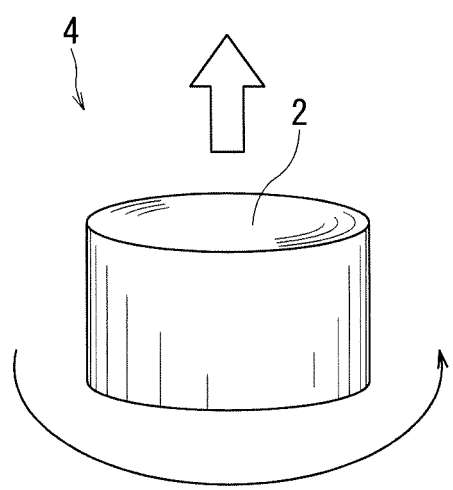
FIG. 3 is a perspective view illustrating a friction stir welding tool which is configured by using a silicon nitride sintered body according to one embodiment.

FIG. 3 illustrates a friction stir welding tool constituted by the silicon nitride sintered body of the present embodiment. In FIG. 3, the reference sign 4 denotes a friction stir welding tool, and the reference sign 2 denotes the friction surface. The friction surface 2 of the friction stir welding tool 4 is composed of a silicon nitride sintered body. Although FIG.

3 illustrates a cylindrical welding tool, it can also be applied to other welding tools having a spherical shape or a convex shape.

Additionally, in order to shorten a welding time of a material to be welded (bonded) and increase production efficiency, it is desirable to set rotational speed of a welding tool member at 500 rpm or more and set its indentation load at 5 kN or more. Further, frictional heat may result in a high temperature environment where a temperature of a friction surface is increased to be 800° C. or higher. Even in such a case, durability of the silicon nitride sintered body at high temperature is improved and thus durability as a welding tool is improved.

In addition to the fields of application as described above, it is also suitable as a constituent material of a high-temperature-resistant member, which is subjected to a use environment of 300° C. or higher, such as a hot work tool and a substrate for a heater.

Further, surface roughness Ra of the friction surface 2 is preferably 5 μm or less. By reducing the surface roughness Ra of the friction surface, it becomes possible to improve abrasion (wear) resistance characteristics and sliding characteristics of a member to be slid like a bearing ball and/or a friction stir welding tool.

Next, a method for producing the silicon nitride sintered body will be described hereunder. The silicon nitride sintered body of the present embodiment is not particularly limited with respect to its production method, as long as having the above-described constitution. However, as a method for efficiently obtaining the foregoing silicon nitride sintered body, the following method is quoted.

Preparation of raw material powder is important for controlling the width of the grain boundary phase of the silicon nitride sintered body to 0.2 nm or more, more preferably 0.2 to 5 nm.

First, a material having an average grain diameter of 2 μm or less, an α-conversion rate of 90% or more, and an impurity oxygen content of 2 wt % or less is prepared as silicon nitride powder.

As a first method, sintering aid powder to be added is preferably so fine that its average grain diameter is 1 μm or less and is more preferably 0.5 μm or less. Further, it is preferable to adjust standard deviation of the average grain diameter (size) of the sintering aid powder to 0.2 μm or less. For controlling the average grain diameter and/or the standard deviation, it is preferable to use methods such as micronization (pulverization) and sieving by a ball mill or a jet mill. Such sintering aid powder and silicon nitride powder are mixed thereby to prepare a raw material powder. The sintering aid becomes a grain boundary phase in the sintering process. A thin grain boundary phase can be formed by using sintering aid powder which is small and uniform in grain diameter.

When the average grain diameter of the silicon nitride powder is defined as A μm and the average grain diameter of the sintering aid powder is defined as B μm, it is preferable to satisfy the relationship of 0.8A≤B. A thin grain boundary phase can be more easily formed by mixing sintering aid powder which has a grain diameter smaller than that of silicon nitride powder. Thus, it is more preferable to satisfy the relationship of 0.7A≤B. Although the lower limit of the ratio of the average grain diameter is not particularly limited, it is preferably in the range of 0.8A≤B≤0.2A. When the average grain diameter B μm of the sintering aid powder is too small as compared with the average grain diameter A μm of the silicon nitride powder, it becomes difficult to adjust width of a grain boundary phase.

The second method is a method of performing a process of producing granulated powder by granulating mixed powder which is obtained by adding an organic binder to the raw material powder (i.e., mixture of silicon nitride powder and sintering aid powder) prepared by the first method. By forming the granulated powder in advance, it is possible to realize a state in which the sintering aid powder is uniformly present around the silicon nitride powder. As a result, it becomes possible to form a predetermined thin grain boundary phase.

Next, a step of filling and molding the granulated powder in a metal die is performed. In the molding step, it is preferable to use a metal die having a target probe shape. As to the molding process, a method such as a metal die molding method and a CIP (cold isostatic pressing method) may be used.

Next, the molded body obtained in the molding step is degreased. The degreasing step is preferably performed at a temperature of 400 to 800° C. in nitrogen gas.

As a third method, heat treatment is performed on the degreased body produced by the second method. The grain surface can be activated by applying the heat treatment to the degreased body. This activation effect makes it possible to form a thin grain boundary phase at the time of sintering and thereby to form solid solution and/or a crystalline compound in the grain boundary phase. The heat treatment temperature is preferably in the range of 300 to 900° C. The heat treatment is preferably performed in vacuum, in inert gas atmosphere, or in the air. In addition, when the heat treatment temperature exceeds 900° C., it becomes difficult to obtain a dense sintered body in the sintering step. The heat treatment time is preferably in the range of 2 to 10 hours. When the heat treatment time is shorter than 2 hours, the effect of heat treatment is insufficient. When the heat treatment time is longer than 10 hours, there is a possibility that the silicon nitride crystal grain is oxidized and thereby it becomes difficult to form a thin grain boundary phase.

Next, the heat-treated body obtained in the third method is sintered. The sintering step is performed at a temperature of 1600° C. or higher. The sintering step is preferably performed in an inert gas atmosphere or in vacuum. A nitrogen gas atmosphere and/or an argon gas atmosphere may be used as the inert gas atmosphere. The sintering step may be performed under a normal pressure sintering method, a pressure sintering method, a HIP (hot isostatic pressing method), or a SPS (spark plasma sintering method). Additionally or alternatively, a plurality of the above sintering methods may be used in combination.

For the obtained sintered body, the place corresponding to the friction surface is subjected to polishing processing. By the polishing processing, surface roughness Ra of the friction surface is made to be 5 μm or less, and is further made to be 1 μm or less. The polishing processing is preferably a polishing processing using a diamond grindstone.

EXAMPLES

Examples 1 to 6 and Comparative Examples 1 and 2

As silicon nitride powder, an α-type silicon nitride powder having an average grain diameter of 1 μm (and a conversion rate of 98%) was prepared. Next, as sintering aid powder, Samples 1 to 6 shown in Table 1 were prepared.

The sintering aid powder was pulverized by a ball mill, and its average grain diameter and standard deviation were measured by using a wet-type grain-diameter distribution measuring machine.

TABLE 1

Sintering Aid Components

| | Added Sintering Aid Powder (mass %) | Total Amount of Sintering Aid Powder (mass %) | Average Grain Diameter (μm) | Standard Deviation (μm) |
|---|---|---|---|---|
| Sample 1 | MgO•Al₂O₃ spinel (3.5) SiO₂ (0.5), SiC (5), TiO₂ (0.5) | 9.5 | 0.8 | 0.2 |
| Sample 2 | MgO•Al₂O₃ spinel (3) SiO₂ (1), SiC (4) | 8 | 0.5 | 0.1 |
| Sample 3 | MgO•Al₂O₃ spinel (4.5) SiO₂ (0.5), SiC (4), TiO₂ (0.8) | 9.9 | 1 | 0.2 |
| Sample 4 | Y₂O₃ (1) MgO•Al₂O₃ spinel (2) AlN (4), HfO₂ (2), Mo₂C (1) | 10 | 0.4 | 0.1 |
| Sample 5 | Y₂O₃ (6), AlN (4), HfO₂ (2) | 12 | 0.9 | 0.2 |
| Sample 6 | Y₂O₃ (6), Al₂O₃ (6), AlN (4) | 16 | 1 | 0.7 |

Silicon nitride powder and 2% by weight of organic binder were mixed with respective Samples 1 to 6 of sintering aid powder thereby to prepare granulated powder, and then molding was performed by using a metal die. The obtained molded body was degreased, and this degreased body was subjected to the heat treatment under the conditions shown in Table 2.

TABLE 2

| Sample No. | Process |
|---|---|
| Example 1 | Degreased Body to which Sample 1 is added is Heat-Treated in Inert Gas Atmosphere (at 400° C. for 9 hours) |
| Example 2 | Degreased Body to which Sample 2 is added is Heat-Treated in Vacuum (at 500° C. for 6 hours) |
| Example 3 | Degreased Body to which Sample 3 is added is Heat-Treated in Vacuum (at 600° C. for 5 hours) |
| Example 4 | Degreased Body to which Sample 4 is added is Heat-Treated in the Atmosphere (at 450° C. for 7 hours) |
| Example 5 | Degreased Body to which Sample 5 is added is Heat-Treated in the Atmosphere (550° C. × 4 hours) |
| Example 6 | Degreased Body to which Sample 5 is added is Heat-Treated in the Atmosphere (at 600° C. for 5 hours) |
| Comparative Example 1 | Degreased Body to which Sample 6 is added |
| Comparative Example 2 | Degreased Body to which Sample 1 is added |

Normal pressure sintering was performed on the heat-treated bodies and degreased bodies prepared in the process of Table 2 at a temperature of 1800 to 1900° C. for 5 to 10 hours. Further, the respective sintered bodies of the Examples 1 to 6 and the Comparative Examples 1 and 2 were subjected to HIP treatment at a temperature of 1700 to 1900° C. Respective silicon nitride sintered bodies having a length of 50 mm, a width of 50 mm, and a thickness of 6 mm were prepared by the above sintering and HIP treatment process.

Further, surface roughness Ra was adjusted to 1 μm.

Three-point bending strength, a fracture toughness value, and Vickers hardness were measured for each of the obtained sintered bodies. Vickers hardness Hv was measured with a test force of 9.807 N (Newton) on the basis of JIS-R-1610. Additionally, a fracture toughness value is determined by using Niihara's equation on the basis of the IF method prescribed in JIS-R-1607. Further, three-point bending strength was measured in accordance with JIS-R-1601. Those parameters were measured at room temperature (25° C.). The measurement results are shown in Table 3 below.

TABLE 3

| Sample No. | Vickers Hardness Hv | Fracture Toughness Value (MPa·m$^{1/2}$) | Three-Point Bending Strength (MPa) |
|---|---|---|---|
| Example 1 | 1560 | 7.2 | 1080 |
| Example 2 | 1500 | 6.9 | 1000 |
| Example 3 | 1560 | 7.2 | 1020 |
| Example 4 | 1490 | 7.3 | 970 |
| Example 5 | 1530 | 7.2 | 1060 |
| Example 6 | 1500 | 7.2 | 920 |
| Comparative Example 1 | 1370 | 6.3 | 850 |
| Comparative Example 2 | 1500 | 6.8 | 1000 |

Next, the average grain diameter and the grain-boundary-phase width of the respective silicon nitride sintered bodies of the Examples and the Comparative Examples were measured by the following procedure. In addition, presence/absence of solid solution or a crystalline compound formation in the grain boundary phase was observed.

As to measurement of the average grain diameter of silicon nitride crystal grains, first, a SEM photograph on an arbitrary cross-section is taken. Next, the major axis (long diameter) and minor axis (short diameter) of the silicon nitride crystal grains shown in the SEM photograph is determined. The grain diameter is determined on the basis of "(Major axis+Minor axis)/2=grain diameter".

The average value of 100 grains of silicon nitride crystal grains was taken as the average grain diameter. Additionally, width of the grain boundary phase was measured by a STEM (scanning transmission electron microscope). Specifically, an arbitrary cross-section of each silicon nitride sintered body is observed first by a STEM (magnified photograph is taken). Next, width of the grain boundary phase is measured by determining an intensity profile of a grain boundary part at the region where distance between two of silicon nitride crystal grains is the closest in the obtained magnified photograph. The presence/absence of solid solution or a crystalline compound in the grain boundary phase was confirmed by an XRD (X-ray diffraction method). The results are shown in Table 4 below.

TABLE 4

| Sample No. | Average Grain Diameter of Silicon Nitride Crystal Grains (μm) | Number Ratio of Silicon Nitride Grains Having a Grain Diameter of 2 μm or more (%) | Width of Grain Boundary Phase (nm) | Solid Solution | Crystalline Compound |
|---|---|---|---|---|---|
| Example 1 | 1.5 | 41 | 1.2 | Presented | Presented |
| Example 2 | 1.4 | 38 | 1.5 | Presented | Presented |
| Example 3 | 1.5 | 45 | 1.7 | Presented | Presented |
| Example 4 | 1.6 | 37 | 2.2 | Presented | Presented |
| Example 5 | 1.7 | 50 | 3.2 | Presented | Presented |
| Example 6 | 1.7 | 48 | 3.7 | None | Presented |
| Comparative Example 1 | 2.1 | 68 | 100 | None | None |
| Comparative Example 2 | 1.8 | 60 | 70 | None | Presented |

As is clear from the results shown in Table 4, the average grain diameter of the silicon nitride crystal grain of the sintered body in each of the Examples was in the range of 1.4 to 2.1 μm, and no large difference was found. However, in contrast, the width of the grain boundary phase is 70 to 100 nm in the Comparative Examples, whereas width of the grain boundary phase of the sintered body in each of the Examples was within the range of 0.2 to 5 nm. Crystal compounds other than YAG, YAM, and YAL were detected in the grain boundary phase of the sintered body in each of the Examples.

Next, Vickers hardness under high temperature conditions was measured for the respective silicon nitride sintered bodies of the Examples and the Comparative Examples. Vickers hardness Hv was measured by changing its measurement environment to 300° C., 800° C., 1000° C., and 1200° C. Vickers hardness Hv was measured by keeping each of the measurement environment temperatures unchanged for one hour. The results are shown in Table 5 below.

TABLE 5

| | Vickers Hardness Hv | | | | |
|---|---|---|---|---|---|
| Sample No. | 25° C. | 300° C. | 800° C. | 1000° C. | 1200° C. |
| Example 1 | 1560 | 1450 | 1220 | 1120 | 1010 |
| Example 2 | 1500 | 1420 | 1200 | 1090 | 990 |
| Example 3 | 1560 | 1500 | 1210 | 1110 | 1030 |
| Example 4 | 1490 | 1390 | 1160 | 990 | 930 |
| Example 5 | 1530 | 1420 | 1150 | 970 | 900 |
| Example 6 | 1500 | 1400 | 1130 | 920 | 850 |
| Comparative Example 1 | 1370 | 1240 | 930 | 750 | 680 |
| Comparative Example 2 | 1500 | 1340 | 1020 | 800 | 720 |

As is clear from the results shown in Table 5, Vickers hardness of the silicon nitride sintered body of each of the Examples was high under high temperature environment. This is because it forms a thin grain boundary phase and thus degradation of the grain boundary phase in a high temperature environment hardly occurs.

As described above, the silicon nitride sintered bodies of the respective Examples exhibit excellent hardness even under a high-temperature environment, so it turned out to be suitable as a constituent material of a high-temperature-resistant member which is subjected to a use environment of 300° C. or higher.

Several embodiments of the present invention are illustrated above. However, these embodiments are presented by way of example only and not intended to limit the scope of the invention. These novel embodiments can be implemented in other various forms. Various omissions, substitutions, alterations, and the like of the embodiments can be made without departing from the gist of the invention. These embodiments and modifications thereof are included in the scope and the gist of the invention and included in the inventions described in claims and a scope of equivalents of the inventions. The embodiments described above can be implemented in combination with one another.

REFERENCE SIGNS LIST

1 bearing ball
2 friction surface
3 rolling roll
4 friction stir welding tool

The invention claimed is:

1. A silicon nitride sintered body comprising silicon nitride crystal grains and a grain boundary phase, wherein:
    the silicon nitride crystal grains are covered with the grain boundary phase;
    the grain boundary phase between two of the silicon nitride crystal grains, which is the shortest or closest distance between two of the silicon nitride crystal grains, has a width of 0.2 nm to 5 nm;
    an area proportion (%) or an area ratio (%) of predetermined silicon nitride crystal grains per a unit area of 50 μm×50 μm is 60% or more, the predetermined silicon nitride crystal grains each having an aspect ratio of 2 or more, and the area proportion (%) or the area ratio (%) being based on an image acquired using SEM at an arbitrary cross-section of the silicon nitride sintered body;
    the grain boundary phase comprises a crystal compound interposed between silicon nitride crystal grains;
    the silicon nitride sintered body includes a grain boundary phase as an additive component in a content of 15% by mass or less;
    the silicon nitride sintered body has a Vickers hardness at room temperature of 1450 or more;
    the silicon nitride sintered body has a Vickers hardness at a temperature of 300° C. of 1350 or more; and
    a ratio of a number of predetermined silicon nitride crystal grains to all the silicon nitride crystal grains is 35% or more, the predetermined silicon nitride crystal grains having an average diameter of a major axis and a minor axis of 2 μm or more, and the ratio of the number of the predetermined silicon nitride crystal grains being based on an image acquired using SEM at an arbitrary cross-section of the silicon nitride sintered body.

2. The silicon nitride sintered body according to claim 1, wherein the silicon nitride sintered body includes three or more elements selected from Y, Al, Mg, Si, Ti, Hf, Mo, and C.

3. The silicon nitride sintered body according to claim 1, wherein Vickers hardness at a temperature of 1000° C. is 850 or more.

4. A high-temperature-resistant member comprising the silicon nitride sintered body according to claim 1.

5. The high-temperature-resistant member according to claim 4, wherein the high-temperature-resistant member is subjected to a use environment of 300° C. or higher.

6. The high-temperature-resistant member according to claim 4, wherein the high-temperature-resistant member is one of a bearing ball, a rolling roll, a friction stir welding tool, a hot work tool, and a heater.

7. The silicon nitride sintered body according to claim 1, wherein a crystal compound other than YAG, YAM, and YAL is contained in the grain boundary phase.

8. The silicon nitride sintered body according to claim 1, wherein the number ratio of the predetermined silicon nitride crystal grains to all the silicon nitride crystal grains is 55% or less.

* * * * *